United States Patent [19]

Omura

[11] Patent Number: 5,368,218
[45] Date of Patent: Nov. 29, 1994

[54] WELD BEAD CUTTER MECHANISM

[75] Inventor: Kazuo Omura, Kakogawa, Japan

[73] Assignee: Kusakabe Electric & Machinery Co. Ltd., Hyogo, Japan

[21] Appl. No.: 84,478

[22] Filed: Jul. 1, 1993

[30] Foreign Application Priority Data

Nov. 27, 1992 [JP] Japan ................. 4-317666

[51] Int. Cl.$^5$ .............. B23K 37/08; B23D 1/08
[52] U.S. Cl. ................. 228/19; 228/125; 409/298
[58] Field of Search .......... 228/125, 147, 151, 160, 228/199, 17.5, 19; 409/297–299, 301; 29/33 D, 33 T, 566.1

[56] References Cited

U.S. PATENT DOCUMENTS

| 3,148,647 | 9/1964 | Woolley et al. | 228/13 |
| 5,216,792 | 6/1993 | Engler et al. | 409/299 |

FOREIGN PATENT DOCUMENTS

| 0045733 | 2/1982 | European Pat. Off. | 409/298 |
| 50-154890 | 12/1975 | Japan . | |
| 52-095389 | 8/1977 | Japan . | |
| 53-044449 | 4/1978 | Japan . | |
| 60-037215 | 2/1985 | Japan . | |
| 61-147989 | 7/1986 | Japan . | |
| 61-209811 | 9/1986 | Japan | 409/299 |
| 62-236647 | 10/1987 | Japan | 409/299 |
| 62-248510 | 10/1987 | Japan . | |
| 2154159 | 9/1985 | United Kingdom | 409/301 |
| 649196 | 2/1981 | U.S.S.R. | 409/298 |

Primary Examiner—Samuel M. Heinrich
Attorney, Agent, or Firm—Sterne, Kessler, Goldstein & Fox

[57] ABSTRACT

A weld bead cutter mechanism continuously planes weld beads projecting from the seam weld zone of an electric seamed steel pipe. The weld bead cutter mechanism fits into an assembly line for manufacturing electric seamed steel pipe right after equipment which continuously molds sheet metal and welds the seam. The weld bead is planed off from the steel pipe by a planing blade, bent by a guide shoe fixed to the planing blade holder, and automatically guided through a groove in a bead guide to a rotary bead chopper. The weld bead is then chopped into small pieces as the rotary bead chopper chops it against a stationary blade. The distance between the planing blade and the rotary bead chopper is minimized by the use of the guide shoe and bead guide, which ensures a stable weld bead movement. The weld bead cutter mechanism operates without requiring manual guidance of the weld bead, which greatly reduces the risk of a labor accident. The chopped pieces of weld bead fall into a disposal bucket or onto a waste discharge conveyor, so the invention does not need to be stopped periodically to remove accumulated weld bead. As a result, the invention and the electric seamed steel pipe assembly line can be run continuously for long periods of time.

7 Claims, 7 Drawing Sheets

WELD BEAD CUTTER MECHANISM

FIELD OF THE INVENTION

The present invention is a weld bead cutter mechanism which fits into an assembly line for manufacturing electric seamed steel pipe. It comes after equipment which continuously cylindrically molds sheet metal and welds the seam. The weld bead cutter mechanism continuously planes the weld beads projecting from the weld zone of the pipe and cuts them into small pieces.

BACKGROUND OF THE INVENTION

Conventionally, bead winders similar to the one shown in FIGS. 1 and 2 have been used to plane weld beads from a weld zone of manufactured metal pipe. The conventional bead winder operates as follows: A planing blade 1 planes a weld bead C from a pipe A. A guide roller R guides the planed weld bead C upward and laterally away from pipe A and planing blade 11 towards a take up reel W rotated by a motor M. Motor M is typically a pneumatic drive, which rotates take up reel W in weak torque. When steel pipe is first fed into the bead winder, an operator must manually guide the first portion of weld bead C planed from the pipe above the guide roller R and wind it onto take up reel W using a tool such as pincers. Weld bead C which is thereafter planed is guided over guide roller R to take up reel W by means of the winding force applied by motor M. Because take up reel W has a limited capacity, the electric seamed steel pipe manufacturing equipment must be stopped at periodic intervals to allow the operator to remove the wound up weld bead C from take up reel W and dispose of it.

The above described method of using equipment with a take up reel to plane weld bead has several problems. The operator is required to manually manipulate the initially planed off weld bead using pincers or a similar tool. The planed off weld bead is sharp and hot, and manual handling could cause a labor accident, such as an incision wound or a burn. Furthermore, the take up reel has a finite capacity. As a result, the whole assembly line must be stopped periodically in order to remove the wound weld beads from the take up reel.

The present invention improves upon the prior method in several ways. It does not require manual handling of the planed off weld bead. Furthermore, it continuously chops and disposes of the weld bead and as it is planed off, so the assembly line does not need to be stopped in order to unload and dispose of the weld bead.

SUMMARY OF THE INVENTION

The present invention, a weld bead cutter mechanism, is designed to be a part of an assembly line for manufacturing electric seamed steel pipe. It fits into the assembly line after equipment which continuously cylindrically molds sheet metal and welds the seam. The weld bead cutter mechanism is used to plane the weld bead produced during welding from the weld zone and dispose of them in a safe and continuous manner. By using the techniques of automatically guiding, continuously chopping, and disposing of the weld beads as they are planed from the pipe, the present invention avoids the problems associated with the equipment traditionally used.

The weld bead formed on the pipe during welding is removed by a planing blade, and is chopped into small pieces by a rotary bead chopper. The small pieces are easily disposed of, so the present invention does not need to be stopped periodically to remove accumulated planed weld bead. The weld bead is guided from the planing blade to the rotary bead chopper by means of a guide shoe which bends the planed weld bead into a bead guide, which then guides the weld bead to the rotary bead chopper. This means of guiding the planed weld bead does not require manual manipulation by the operator, which reduces the risk of injury from the sharp, hot weld bead.

BRIEF DESCRIPTION OF THE DRAWINGS

The foregoing and other objects, features and advantages of the present invention should become apparent from the following description when taken in conjunction with the accompanying drawings, in which.

DESCRIPTION

The accompanying FIGS. 3–7 are used to explain the present invention. For the convenience of the reader, an element which appears in multiple figures is referenced by the same number or letter. An electric seamed steel pipe A is forcibly transported from right to left in FIG. 3, from right to left along axial line L—L in FIG. 4, and up out of the paper in FIG. 5.

Figure 1:
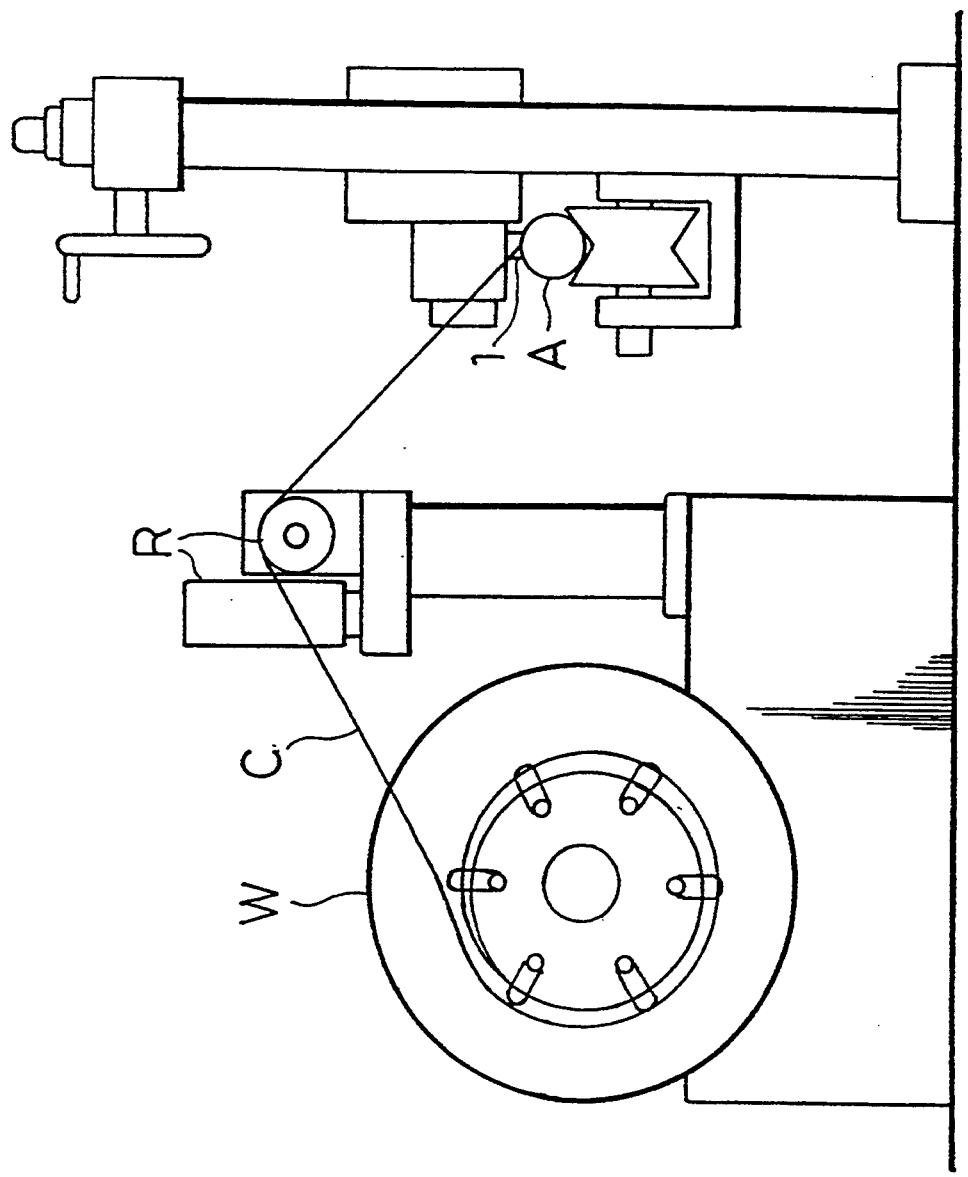
FIG. 1 is a front view of a conventional bead winder.
Figure 2:
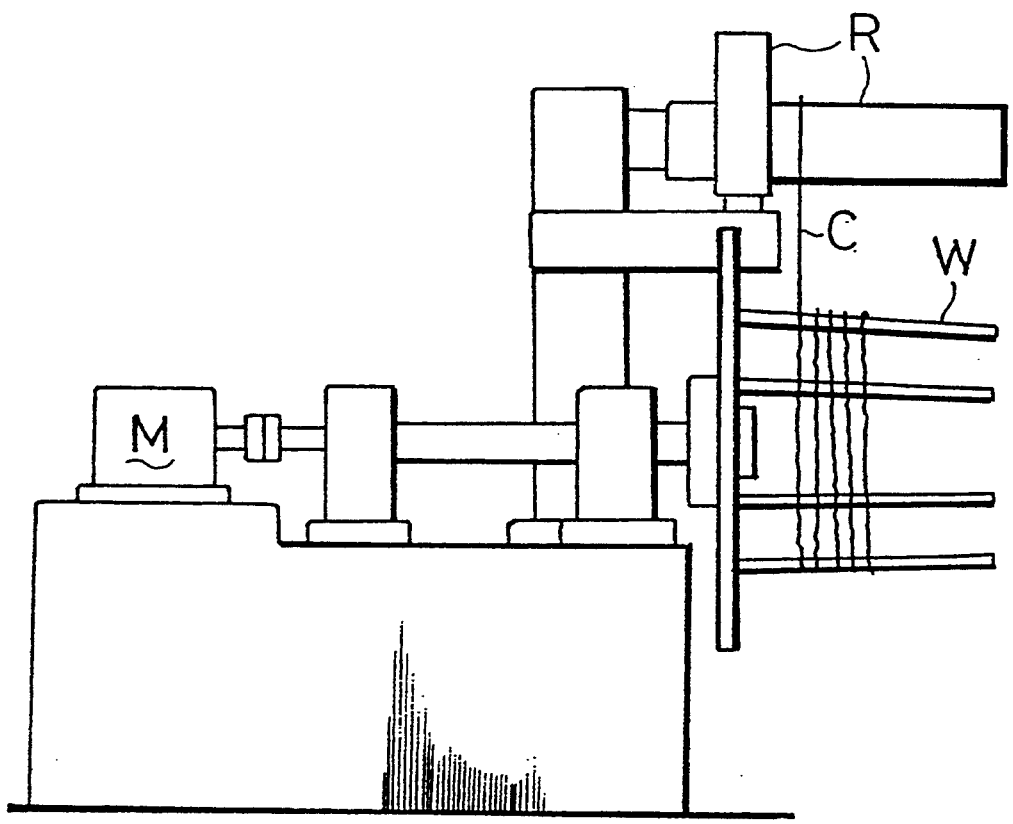
FIG. 2 is a side view thereof.
Figure 3:
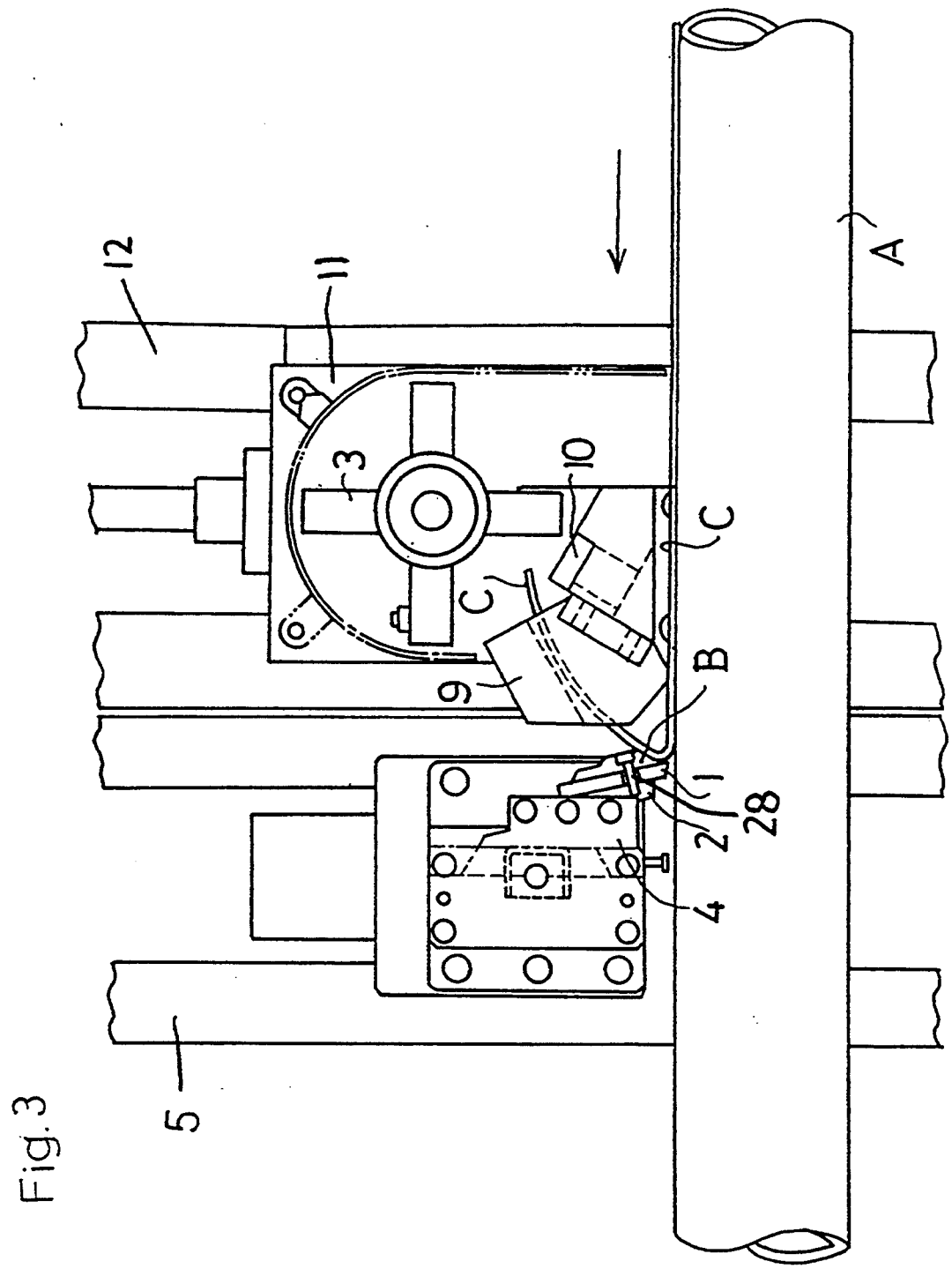
FIG. 3 is a partial front view of the weld bead cutter of the present invention.

Referring first to FIG. 3, a planing blade 1 and a guide shoe B are fixed to a blade holder 2 by a bolt 28. A bead guide 9, a stationary blade 10, and a rotary bead chopper 3 are supported by a block 11. As pipe A is forced from right to left, planing blade I planes a weld bead C from the pipe. Guide shoe B bends weld bead C up and toward bead guide 9. Bead guide 9 then guides weld bead C to rotary bead chopper 3, where weld bead C is chopped into small pieces by rotary bead chopper 3 and stationary blade 10. It has been experimentally shown that the distance between planing blade 1 and rotary bead chopper 3 should be less than approximately 100 mm to ensure a stable movement path for weld bead C. Guide shoe B and bead guide 9 are designed to minimize the distance between planing blade 1 and rotary bead chopper 3.

Figure 4:
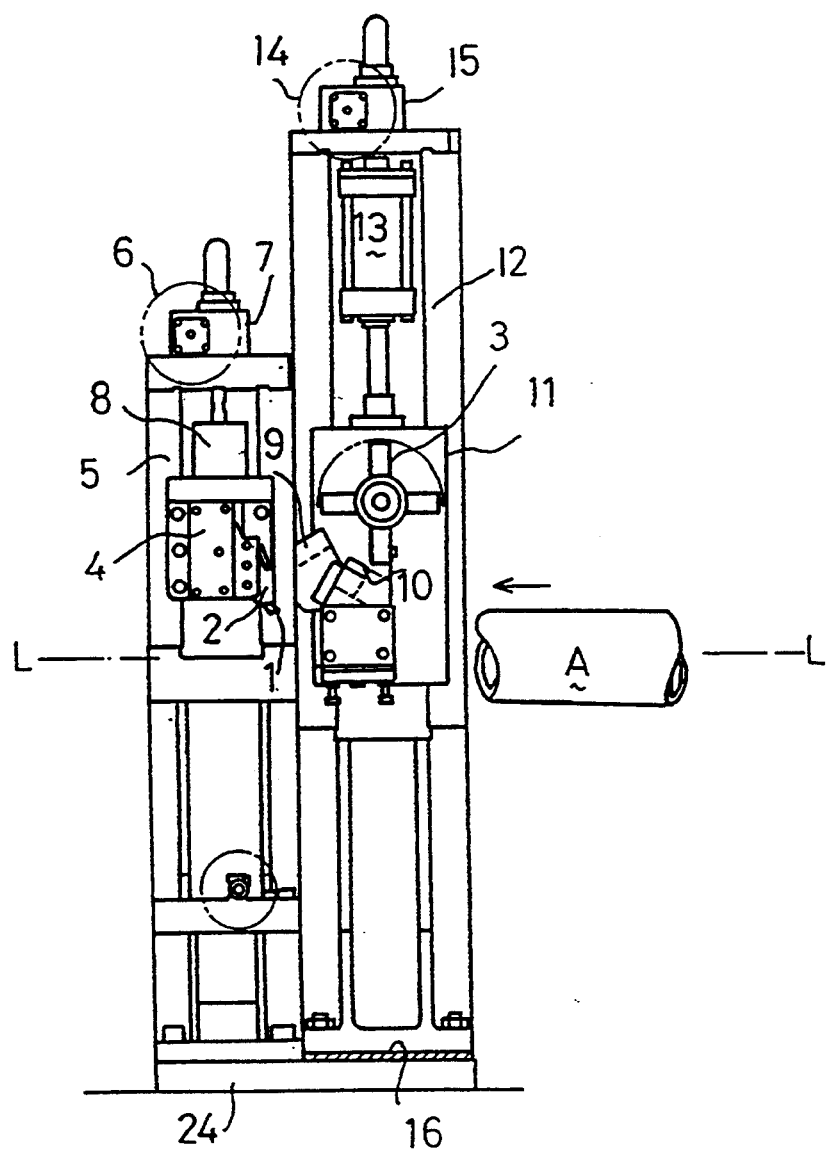
FIG. 4 is a complete front view thereof.

Referring now to FIG. 4, a block 4 supports blade holder 2. Block 4 is inserted into a stand 5, and can be vertically adjusted with respect to stand 5 in order to accommodate pipes of different diameters. This vertical adjustment is accomplished by means of a screw mechanism and a gear 7 driven by a drive motor 6. Block 4, blade holder 2, and planing blade 1 can be quickly moved vertically by means of a pneumatic cylinder 8 in emergency situations when the drive motor 6 is not fast enough.

Block 11 is inserted into a stand 12, and can be vertically adjusted with respect to stand 12 in order to accommodate pipes of different diameters. This vertical adjustment is accomplished by means of a screw mechanism and a gear 15 driven by a drive motor 14. Block 11 can be quickly moved vertically by means of a pneumatic cylinder 13 in emergency situations when the drive motor 14 is not fast enough.

Figure 5:
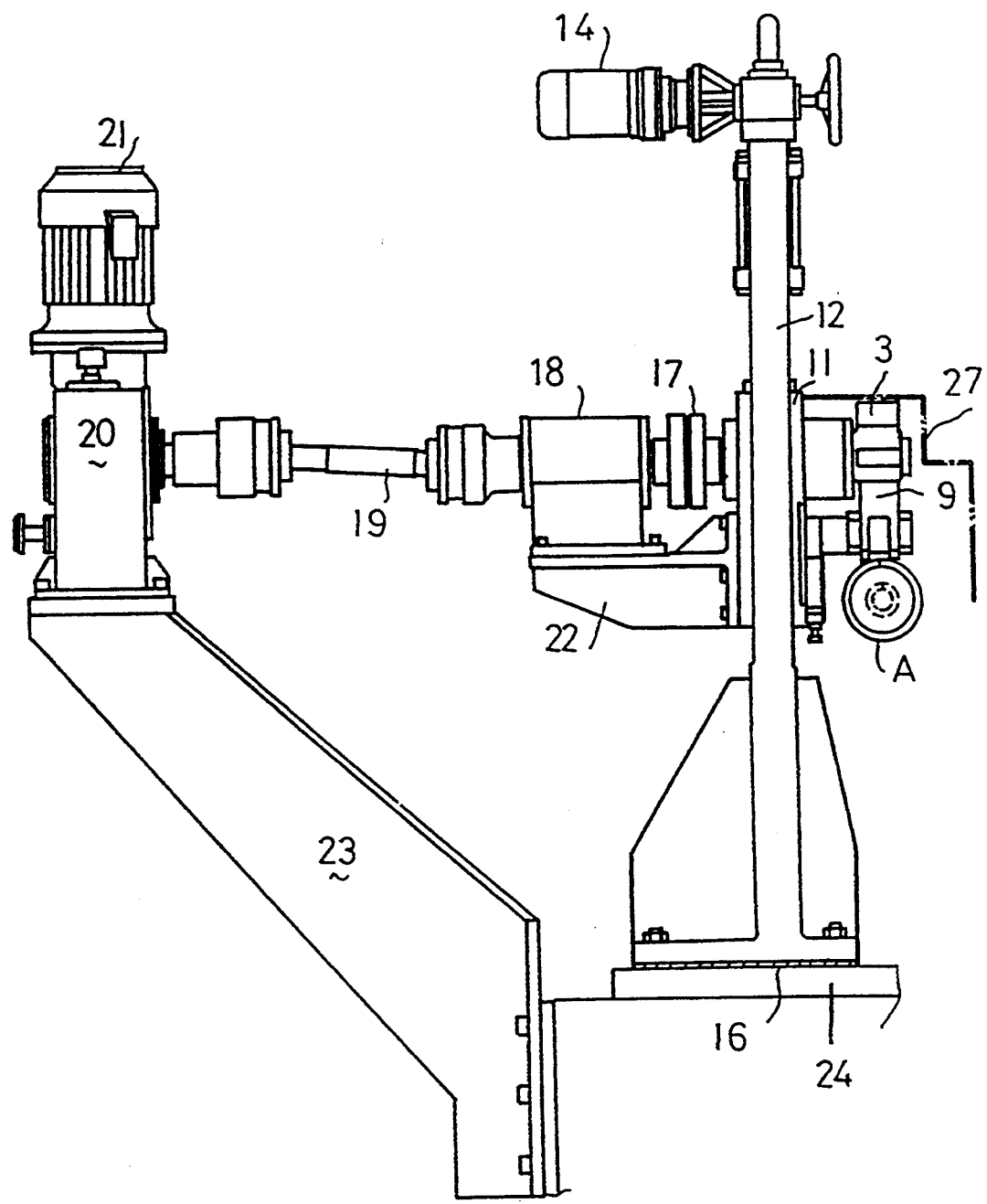
FIG. 5 is a side view thereof.

Referring now to FIG. 5, a guide cover 27, attached to block 11, prevents the chopped weld beads from scattering on all sides, and directs them into a waste bucket or a waste discharge conveyor (not shown). A coupling 17 and a bearing 18 are mounted on a support frame 22, and constitute a rotatable drive mechanism for the rotary bead chopper 3. Coupling 17 and bearing 18 are driven in rotation by a drive motor 21, a reduction gear mechanism 20 and a universal drive shaft 19 which are mounted on a separate stand 23. Support frame 22 is mounted on stand 12, and stand 12 is mounted on a base plate 24. A cushion plate 16 between stand 12 and base plate 24 prevents vibrations caused by the rotation and chopping of rotary bead chopper 3 from being transmitted to other parts of the machine.

Figure 6:
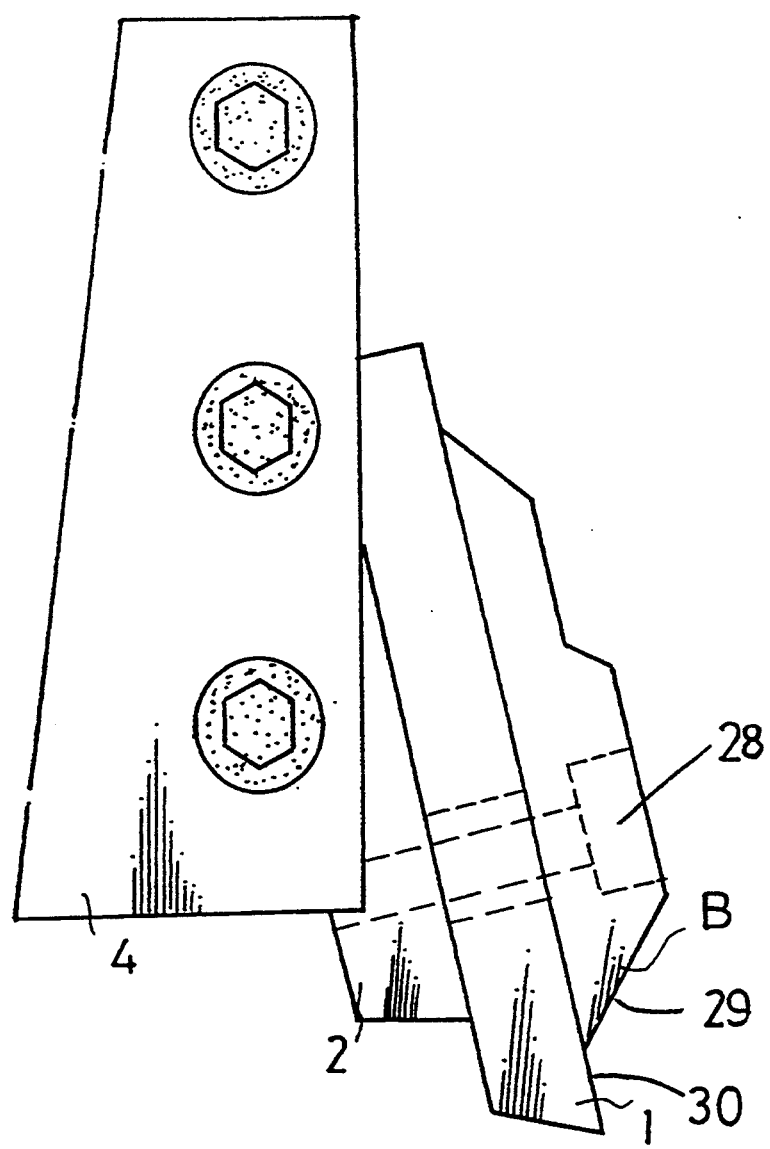
FIG. 6 is an enlarged front view of the planing blade 1 and the guide shoe B of FIG. 3.

FIG. 6 shows planing blade 1 and nearby parts in detail. Planing blade 1 is fixed to blade holder 2. Blade holder 2 is fixed at an angle to block 4 with bolt 28. Bolt 28 also fixes guide shoe B to planing blade 1 and block 4. An outer surface 29 of guide shoe B is at an angle with an outer surface 30 of planing blade 1. This angle bends weld bead C up and away from block 4 after it is planed by planing blade 1.

Figure 7:
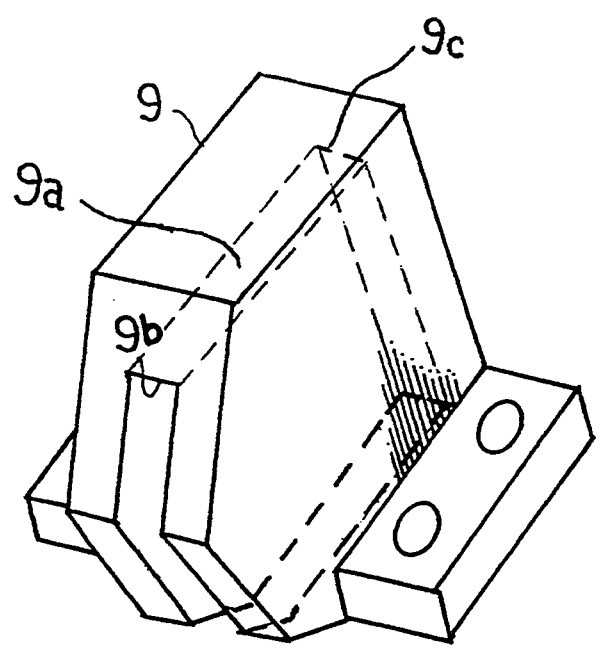
FIG. 7 is an enlarged perspective view of the bead guide 9 of FIG. 3.

FIG. 7 shows the bead guide 9 in detail. When assembled into the weld bead cutter mechanism, an inlet 9b of a guide groove 9a is located just behind guide shoe B. Rotary bead chopper 3 and stationary blade 10 are located just outside an outlet 9c of guide groove 9a.

The present invention, constructed as described above, operates as follows. Weld bead C is planed from the pipe A, and is then bent upward and toward bead guide 9 by guide shoe B. Weld bead C is then guided by bead guide 9 to a position between stationary blade 10 and rotary bead chopper 3, where it is chopped into small pieces as the outer edge of rotary bead chopper 3 hits stationary blade 10.

There is no need for the operator to manually guide weld bead C, which greatly reduces the risk of a labor accident. Because weld bead C is chopped into small pieces and continuously discharged through guide cover 27 into a waste bucket or onto a waste discharge conveyor (not shown), the electric seamed steel pipe assembly line does not need to be stopped on account of the weld bead cutter mechanism, and can be operated continuously for a long time. These features make the present invention an innovative and useful addition to the manufacturing process for electric seamed steel pipe.

While preferred embodiments have been set forth, various modifications, alterations, and changes may be made without departing from the spirit and scope of the present invention as defined in the appended claims.

What is claimed is:

1. A weld bead cutter mechanism, comprising:
   a planing blade for planing a weld bead from a seam weld zone along a pipe;
   a rotary bead chopper which chops said planed weld bead into small pieces; and
   a bead guide located between said planing blade and said rotary bead chopper, said bead guide being provided with a guide groove for guiding said weld bead from said planing blade to said rotary bead chopper.

2. The weld bead cutter mechanism of claim 1 further comprising:
   a guide shoe disposed adjacent to said planing blade which guides said weld bead from said planing blade upward and toward said bead guide.

3. The weld bead cutter mechanism of claim 1, wherein said planing blade and said rotary bead hopper are arranged such that the distance of said weld bead between said planing blade and said bead chopper is less than approximately 100 mm.

4. A weld bead cutter mechanism, comprising:
   a planing blade for planing a weld bead from a weld zone along a pipe;
   a rotary bead chopper which chops said planed weld bead into small pieces;
   a bead guide located between said planing blade and said rotary bead chopper, said bead guide being provided with a guide groove for guiding said weld bead from said planing blade to said rotary bead chopper; and
   a guide shoe disposed adjacent to said planing blade which guides said weld bead from said planing blade upward and toward said bead guide.

5. The weld bead cutter mechanism of claim 4, wherein said planing blade and said rotary bead chopper are arranged such that the distance of said weld bead between said planing blade and said bead chopper is less than approximately 100 mm.

6. A weld bead cutter mechanism, comprising:
   a planing blade for planing a weld bead from a weld zone along a pipe;
   a rotary bead chopper which chops said planed weld bead into small pieces,
   wherein said planing blade and said rotary bead chopper are arranged such that the distance of said weld bead between said planing blade and said bead chopper is less than approximately 100 mm; and
   a bead guide located between said planing blade and said rotary bead chopper, said bead guide being provided with a guide groove for guiding said weld bead from said planing blade to said rotary bead chopper.

7. The weld bead cutter mechanism of claim 6, further comprising:
   a guide shoe disposed adjacent to said planing blade which guides said weld bead from said planing blade upward and toward said bead guide.

* * * * *